United States Patent [19]

Taguchi et al.

[11] Patent Number: 4,584,370

[45] Date of Patent: Apr. 22, 1986

[54] PROCESS FOR THE PRODUCTION OF CALCIUM CELLULOSE GLYCOLATE

[76] Inventors: Jun Taguchi, 6-24, Higashikanmake 3-chome, Takatsuki, Osaka; Hiroomi Kobayashi, 12-26 Kotsubo 1-chome, Zushi, Kanagawa; Takahiro Koyama, 1903-3, Okihama, Aboshi-ku, Himeji, Hyogo, all of Japan

[21] Appl. No.: 640,313

[22] Filed: Aug. 13, 1984

[30] Foreign Application Priority Data

Aug. 12, 1983 [JP] Japan ............................ 58-146484

[51] Int. Cl.$^4$ .................. C08B 11/20; C08B 15/04
[52] U.S. Cl. .................................. 536/87; 536/85; 536/97; 536/98
[58] Field of Search .............. 424/362; 536/85, 87, 536/97, 98

[56] References Cited

U.S. PATENT DOCUMENTS

| | | | |
|---|---|---|---|
| 2,331,858 | 10/1943 | Freeman et al. | 536/98 |
| 2,420,949 | 5/1947 | Hager et al. | 536/98 |
| 2,781,341 | 2/1957 | de Ruyter | 536/85 |
| 3,563,978 | 2/1971 | Ochs | 536/98 |
| 4,229,572 | 10/1980 | Zweigle | 536/85 |
| 4,235,937 | 11/1980 | Remer | 426/486 |
| 4,250,306 | 2/1981 | Lask et al. | 536/85 |
| 4,426,518 | 1/1984 | Omiya | 536/98 |

FOREIGN PATENT DOCUMENTS 493366  6/1953  Canada ................................ 536/85

Primary Examiner—Ronald W. Griffin

[57] ABSTRACT

The present invention is directed to a method of producing calcium cellulose glycolate. Basically, the method comprises converting sodium cellulose glycolate to calcium cellulose glycolate in a heterogeneous reaction system under particular reaction conditions.

4 Claims, No Drawings

PROCESS FOR THE PRODUCTION OF CALCIUM CELLULOSE GLYCOLATE

BACKGROUND OF THE INVENTION

1. Field of the Invention

This invention relates to an improved process for producing calcium cellulose glycolate. This compound is a tasteless, odorless cellulose derivative which is used industrially as a disintergrating agent for tablets for use in medicines and foods. Calcium cellulose glycolate is compression moldable and water insoluble. It swells upon the addition of water to disintegrate.

2. Description of the Prior Art

A process for making calcium cellulose glycolate is described in Japanese Patent Publication No. 7960/1968 (hereinafter "the Japanese application"). In that process, purified cellulose glycolic acid is neutralized with calcium carbonate in the presence of water, dried and then pulverized. The use of calcium carbonate is the most significant feature of the process. Its use results in the production of gaseous carbon dioxide as a by-product which eliminates the need for the purification of the reaction product and results in the production of a product of high purity. In addition, the use of calcium hydroxide, calcium acetate, calcium chloride and calcium phosphate are listed as calcium-substituting agents and compared.

The purified cellulose glycolic acid used as the starting material for the process of the Japanese application can be obtained by adding a strong acid such as sulfuric acid or hydrochloric acid to sodium cellulose glycolate and then eliminating the resulting salt as a by-product.

Sodium cellulose glycolate can be prepared by reacting pulp with sodium hydroxide and mono-chloro acetic acid. There are two principle methods known in the art. One method employs water as the reduction medium. The other method employs a water lower alkyl alcohol mixture as the reaction medium. The former will be hereinafter referred to as the aqueous medium method and the latter will be referred to as the solvent medium method.

When carrying out the production of sodium cellulose glycolate by the solvent medium method, the reaction of the mono-chloro acetic acid is more efficient and the product that is obtained has a higher degree of substitution as compared with the production of the sodium cellulose glycolate by the aqueous medium method. For these reasons, the solvent method is considered the more advantageous process for producing sodium cellulose glycolate. However, the solvent method has not been of any use in the production of calcium cellulose glycolate, since it does not produce cellulose glycolic acid. Thus, as discussed above, the Japanese application describes a method for producing calcium cellulose glycolate from cellulose glycolic acid. If the solvent method did produce cellulose glycolic acid, at some point in the process, that process might have been useful in the production of calcium cellulose glycolate.

In contrast, in the aqueous medium method, the sodium cellulose glycolate which is prepared is converted into the free acid, cellulose glycolic acid, in the aqueous medium. The resulting cellulose glycolic acid is precipitated and washed with water for purification. Thus, cellulose glycolic acid at a high purity can be obtained in the purification step. Accordingly, the ability to use the cellulose glycolic acid as the starting material for the process of the Japanese application is an advantage of the aqueous medium method over the solvent method. In fact, the cellulose glycolic acid used as the starting material in the industrial production of calcium cellulose glycolate is obtained by the aqueous medium method described above.

The aqueous medium method, however, does have disadvantages. For example, the effective rate of utilizing the etherifying agent upon etherification is lower as compared with the solvent method. Thus, highly etherified product is difficult to obtained by the aqueous medium method.

SUMMARY OF THE INVENTION

The present invention relates to a process for producing calcium cellulose glycolate by directly reacting sodium cellulose glycolate with a calcium substituting agent and thereby avoiding the necessity of forming the free acid required in the prior art. The process is carried out in a heterogeneous reaction system under particular reaction conditions.

DETAILED DESCRIPITON OF THE INVENTION

Direct reaction of sodium cellulose glycolate with a calcium substituting agent to directly produce the calcium salt thereof has not been practiced heretofore due to several problems encountered when such a process is attempted. For example, since there is little difference between the ionizing potentials of sodium and calcium, the reaction is difficult to perform in a homogeneous reaction system. While the reaction conditions can generally be set such that the reaction system is homogeneous and a production system is heterogeneous for performing the above described reaction, a problem has been encountered with high molecular substances where the reaction product is a precipitate. Moreover, it has been found that it is very difficult to keep the reaction proceeding unless such precipitates have a relatively large surface area.

According to the present invention, the reaction of sodium cellulose glycolate with a calcium substituting agent proceeds smoothly and yields a product of a high purity. This is accomplished by selecting the reaction conditions to conduct the reaction in a heterogeneous system while maintaining the high molecular weight substances involved in the reaction, that is, the cellulose derivatives, in a sufficiently swollen state. As defined herein, sufficiently or adequately swollen state means that the ratio of swelling of the wet swollen cellulose glycolate to dry powdery cellulose glycolate is of from about 4/1 to 8/1 or the ratio of wet swollen cellulose glycolate to wet unswollen cellulose glycolate is from about 1.5/1 to about 2.5/1.

In converting the sodium cellulose glycolate into the calcium salt, a mixed solvent of water and a lower alkyl alcohol is suitable as a reaction medium for maintaining the high molecular starting material and the reaction product in a sufficiently swollen state.

Suitable lower alkyl alcohols include alcohols having 1–4 carbon atoms such as methanol and isopropanol. However, any lower alkyl alcohol may be used. The amount of sodium cellulose glycolate present in relation to the initial solvent is from about ⅛ to about 1/60 parts by weight and more preferably from about 1/5 to about 1/40 parts by weight. It is important according to the the present invention that the amount of water initially present is small relative to the starting material. The water is present in an amount sufficient to adequately swell the sodium cellulose glycolate and in an amount sufficient to render the NaCl present with the sodium cellulose glycolate soluble in the solvent. The ratio of alcohol to water present in the mixed solvent is from about 95/5 to about 60/40 parts by weight. More preferably the ratio of alcohol to water is of from about 90/10 to about 80/20. However, during the reaction, additional water is added in an amount sufficient so that the reaction product is also maintained in a sufficiently swollen state. Such criteria can be achieved by conducting the reaction initially in the presence of a small amount of water and increasing the amount of the water during the course of the reaction. The reaction is carried out at a temperature of from about 25° to about 80° C.

The calcium substituting agent is an important factor in the present invention. Calcium chloride is suitable for this purpose because it has a high solubility in the mixed solvent of water/lower alkyl alcohol. Any suitable calcium substituting agent may be employed, including calcium nitrate, calcium acetate, calcium propionate, and calcium formate. A by-product of the substitution reaction when calcium chloride is used, is sodium chloride. It can be eliminated by washing with a water/lower alkyl alcohol mixed solvent.

In a preferred embodiment according to this invention, an equivalent weight or more of calcium chloride is added to sodium cellulose glycolate which has been dispersed and suspended in a lower alkyl alcohol containing water. The components are reacted at about 70° C. During the reaction the amount of water is adjusted in the reaction system to more than 2 times and less than 20 times by weight of the sodium cellulose glycolate, by adding additional water to the system after the reaction has proceeded for a predetermined time. Preferably, the water addition is made during a period starting at about 20 minutes after the reaction begins between the sodium and calcium components and ending about 20 minutes prior to the end of the reaction. The water may be added in any suitable manner including continuously, intermittently or all at once. However, it is preferred that it be added continuously. Thereafter the reaction is preferably continued at about 70° C. until completion.

While purified sodium cellulose glycolate is preferably used, non-purified reaction product prepared by the solvent method discussed above can also be used. Particularly, in the latter case, where a lower alkyl alcohol/water mixed solvent is used as the reaction solvent for the etherification, the calcium conversion process is carried out by combining the reaction product with the solvent of the same type. This results in a lower total production cost.

The invention will now be described referring to examples, which in no way restrict this invention.

EXAMPLE 1

Sodium cellulose glycolate having the analytical composition as described below was used.

| | |
|---|---|
| 1% aqueous solution: viscosity | 154 cps (25° C.) |
| 1% aqueous solution: pH | 6.9 |
| Etherification degree | 0.46 |
| Bonded Na | 5.3% |
| NaCl content | 0.76% |

50 g of finely powdered sodium cellulose glycolate having the above described analytical composition were dispersed and suspended in a mixed solvent comprising methanol 357 g/water 125 g. 84 g of calcium chloride were added to the suspension, stirred at 70° C. for 30 min. and dissolved and reacted with the coexistent sodium cellulose glycolate. Then, 600 g of water were added and further stirred at 70° C. for one hour. The reaction system was maintained as a suspension system. After a predetremined of time, the reaction system was filtered to collect solid matter, which was washed twice within 400 ml of 75% aqueous methanol solution and then dried. The molar ratio between the calcium substituting agent and the bonded Na in the starting material was 10 and the ratio by weight between water and the starting sodium cellulose glycolate in the reaction system was 14.5 in this reaction.

The recovered reaction product was calcium cellulose glycolate, which exhibited excellent performance as a disintegrating agent for use in tablets. The physical properties and the analytical values were as below.

| | |
|---|---|
| Water insoluble but having excellent swelling properties | |
| pH of medium as 1% aqueous suspension | 6.0 |
| Bonded Na | 0% |
| Bonded Ca | 7.59% |

COMPARATIVE EXAMPLE

Sodium cellulose glycolate having the following analytical composition was used for the reaction.

| | |
|---|---|
| 1% aqueous solution: viscosity | 161 cps (25° C.) |
| 1% aqueous solution: pH | 6.9 |
| Etherfication degree | 0.73 |
| Bonded Na | 7.6% |
| NaCl content | 0.63% |

After dissolving 183.7 g of calcium chloride in a mixed solvent comprising methanol 378 g/water 125 g, 100 g of sodium cellulose glycolate having the above described analytical composition were added and reacted while stirring at 40°-50° C. for 2 hours. The solid matters were filtered out and washed 3 times with 75% aqueous methanol solution.

The molar ratio between the calcium substituting agent and the bonded Na in the starting material was 10 and the ratio by weight between water and the starting material in the reaction system was 1.25 in this reaction.

The physical properties and the analytical values of the reaction product are:

| | |
|---|---|
| Soluble to water | |
| pH of 1% aqueous solution | 7.0 |
| Bonded Na | 4.42% |
| Bonded Ca | 4.58% |

In the reaction product of the above Comparative Example, Na was not completely substituted with Ca and the product maintained water solubility. While the product may also be used as the disintegrating agent, it showed poorer disintegrating performance than that of calcium cellulose glycolate comercially available at present (trade name ECG).

EXAMPLE 2

Sodium cellulose glycolate having the following analytical composition was used for the reaction.

| | |
|---|---|
| 1% solution: viscosity | 630 cps (25° C.) |
| 1% solution: pH | 6.6 |
| Etherficiation degree | 0.63 |
| Bonded Na | 6.8% |
| NaCl content | 0.46% |

25 g of sodium cellulose glycolate and 20.5 g of calcium chloride were charged and mixed into a mixed solvent of isopropanol 568 g/water 85 g, stirred at 35° C. for 15 min., then stirred at an increased temperature of 70° C. for 60 min. to react. Then, 75 g of water were further added and the stirring was continued at 70° C. for 60 min. After the completion of the reaction, the solid matters were filtered out, washed 4 times with 80.0 ml of 70% methanol solution and then dried. The molar ratio between the calcium substituting agent and the bonded sodium in the starting material used for the reaction was 5 and the ratio between water and the starting material was 7.4.

The product had the following analytical values and exhibited excellent performance as a disintegrating agent for use in tables.

| | |
|---|---|
| Insoluble to water but having excellent swelling properties | |
| pH of medium as 1% aqueous suspension | 7.5 |
| Bonded Na | 0% |
| Bonded Ca | 7.3% |

We claim:

1. A process for producing calcium cellulose glycolate having excellent swelling properties and being insoluble in water comprising swelling sodium cellulose glycolate in a lower alkyl alcohol containing sufficient water to swell said sodium cellulose glycolate, dispersing said swelled sodium cellulose glycolate in said alcohol and water, adding at least an equivalent amount of calcium chloride to react with a part of said sodium cellulose glycolate for a predetermined period to form calcium cellulose glycolate and subsequently adding additional water in an amount sufficient to swell said formed calcium cellulose glycolate, continuing said reaction, and thereafter recovering the calcium cellulose glycolate.

2. The process of claim 1 wherein the amount of water in the system is greater than 2 times and less than 20 times by weight the amount of sodium cellulose glycolate.

3. The process of claim 2 further comprising recovering a calcium cellulose glycolate which is substantially sodium free.

4. The process of any one of claims 1, 2 or 3, wherein said lower alkylalcohol contains 5 percent to 40 weight percent by weight of water.

* * * * *